US010865576B1

(12) United States Patent
Kats et al.

(10) Patent No.: US 10,865,576 B1
(45) Date of Patent: Dec. 15, 2020

(54) SCAFFOLD SECURING CLIP AND STRAP

(71) Applicants: Kenneth Kats, Labelle, FL (US); Edward Deleon, Labelle, FL (US)

(72) Inventors: Kenneth Kats, Labelle, FL (US); Edward Deleon, Labelle, FL (US)

( * ) Notice: Subject to any disclaimer, the term of this patent is extended or adjusted under 35 U.S.C. 154(b) by 199 days.

(21) Appl. No.: 16/149,244

(22) Filed: Oct. 2, 2018

(51) Int. Cl.
*E04G 7/28* (2006.01)
*F16B 2/08* (2006.01)
*E04G 1/15* (2006.01)
*E04G 5/06* (2006.01)

(52) U.S. Cl.
CPC .............. *E04G 7/28* (2013.01); *E04G 1/15* (2013.01); *E04G 5/061* (2013.01); *F16B 2/08* (2013.01)

(58) Field of Classification Search
CPC combination set(s) only.
See application file for complete search history.

(56) References Cited

U.S. PATENT DOCUMENTS

| 3,792,756 A | 2/1974 | Kelly |
| 4,611,784 A * | 9/1986 | Gallis .............. E04G 5/04 249/20 |
| D440,144 S | 4/2001 | Todd |
| 7,367,425 B2 | 5/2008 | Rivers |
| 8,316,993 B1 | 11/2012 | Rudd |
| 9,551,183 B2 | 1/2017 | Rudd |
| 9,797,195 B2 | 10/2017 | DeCuir |
| 10,112,806 B1 * | 10/2018 | Dahl ................ B66C 23/64 |
| 2006/0124394 A1 | 6/2006 | Bracken |
| 2016/0153234 A1 | 6/2016 | Mazanek |

FOREIGN PATENT DOCUMENTS

| GB | 164213 A * | 6/1921 | ............... E04G 5/06 |
| WO | 2004097154 | 11/2004 | |

* cited by examiner

*Primary Examiner* — Kyle Armstrong
(74) *Attorney, Agent, or Firm* — Kyle A. Fletcher, Esq.

(57) ABSTRACT

The scaffold securing clip and strap comprises a ratchet strap, a scaffolding jib and a bracket. The scaffold securing clip and strap is configured for use with a stanchion. The ratchet strap attaches the scaffolding jib to the stanchion. The bracket attaches the scaffolding jib to the stanchion. A first instantiation of the scaffold securing clip and strap works in conjunction with a second instantiation of the scaffold securing clip and strap to support one or more planks.

Specifically, the scaffolding jib of the first instantiation and the scaffolding jib of the second instantiation combine to raise one or more planks to an elevation above a supporting surface of the stanchions to which the first instantiation and the second instantiation are attached. The elevated one or more planks form a raised horizontal surface capable of supporting a load.

19 Claims, 6 Drawing Sheets

SCAFFOLD SECURING CLIP AND STRAP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of building and scaffolding, more specifically, an accessory configured for use connections between parts of a scaffolding with separate coupling elements.

SUMMARY OF INVENTION

The scaffold securing clip and strap comprises a ratchet strap, a scaffolding jib, and a bracket. The scaffold securing clip and strap is configured for use with a stanchion. The ratchet strap attaches the scaffolding jib to the stanchion. The bracket attaches the scaffolding jib to the stanchion. A first instantiation of the scaffold securing clip and strap works in conjunction with a second instantiation of the scaffold securing clip and strap to support one or more planks. Specifically, the scaffolding jib of the first instantiation of the scaffold securing clip and strap and the scaffolding jib of the second instantiation of the scaffold securing clip and strap combine to raise one or more planks to an elevation above the supporting surface of the stanchions to which the first instantiation of the scaffold securing clip and strap and the second instantiation of the scaffold securing clip and strap are attached. The elevated one or more planks form a raised horizontal surface capable of supporting a load.

These together with additional objects, features and advantages of the scaffold securing clip and strap will be readily apparent to those of ordinary skill in the art upon reading the following detailed description of the presently preferred, but nonetheless illustrative, embodiments when taken in conjunction with the accompanying drawings.

In this respect, before explaining the current embodiments of the scaffold securing clip and strap in detail, it is to be understood that the scaffold securing clip and strap is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the scaffold securing clip and strap.

It is therefore important that the claims be regarded as including such equivalent construction insofar as they do not depart from the spirit and scope of the scaffold securing clip and strap. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
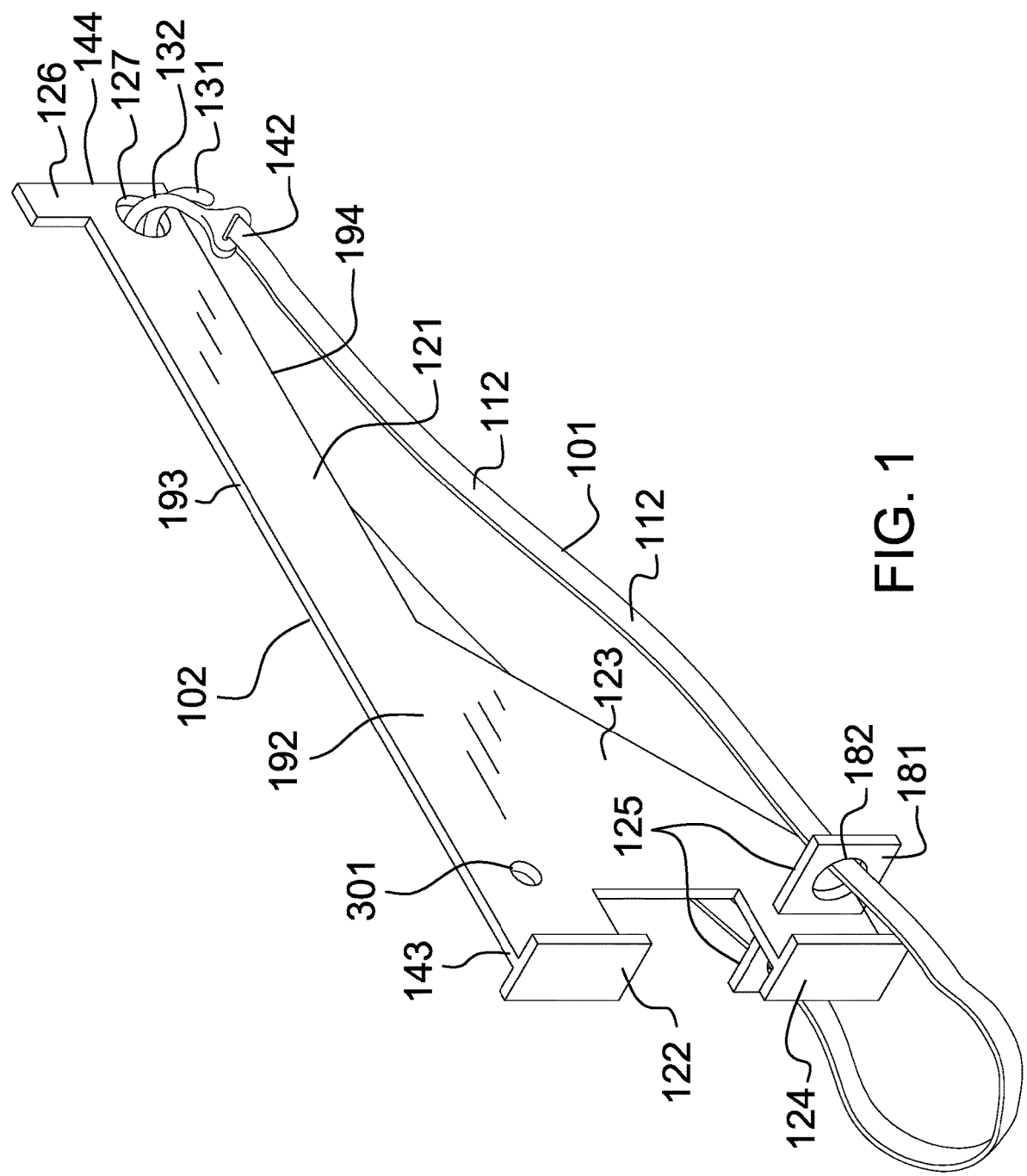
FIG. 1 is a perspective view of an embodiment of the disclosure.
Figure 2:
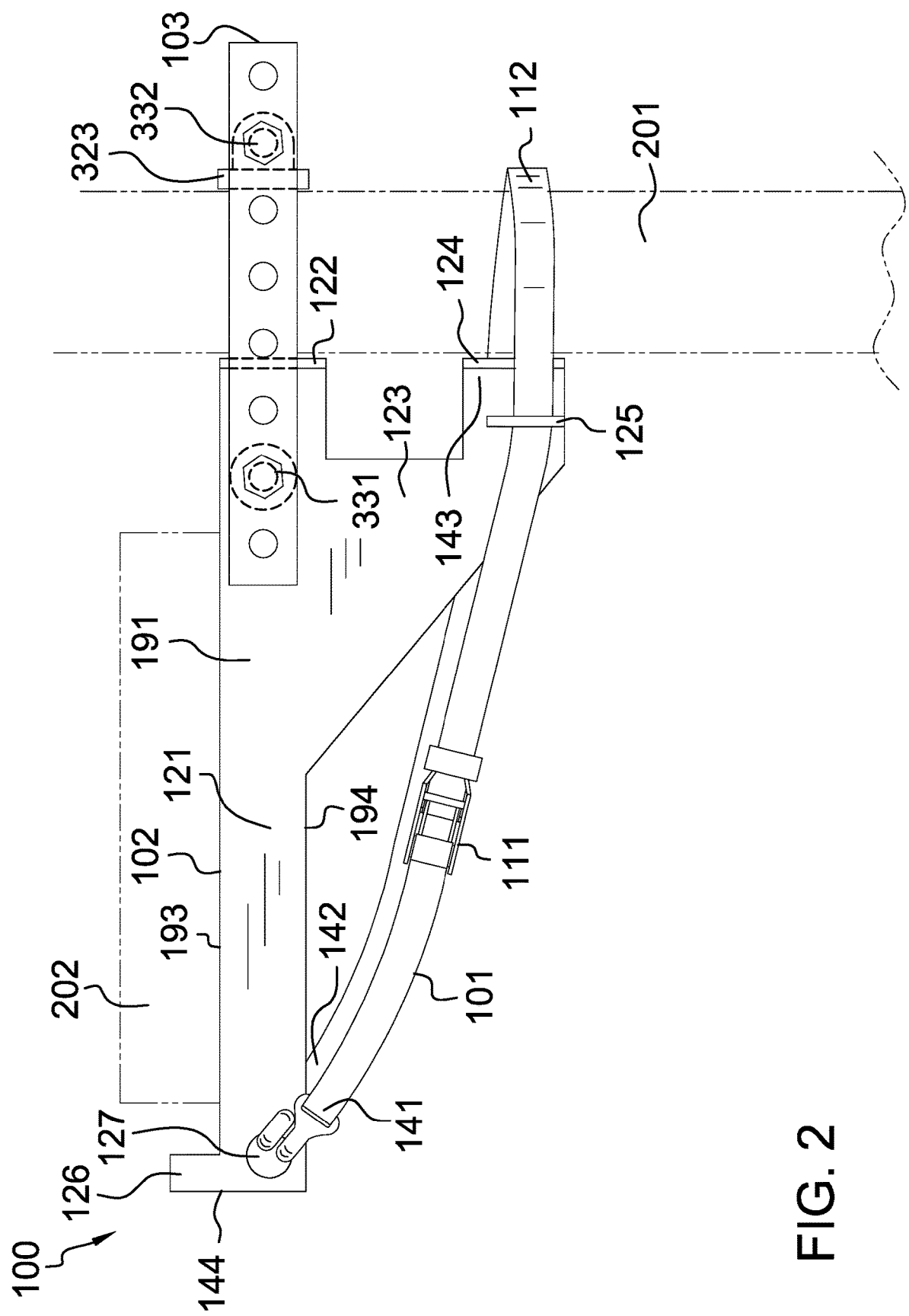
FIG. 2 is a front view of an embodiment of the disclosure.
Figure 3:
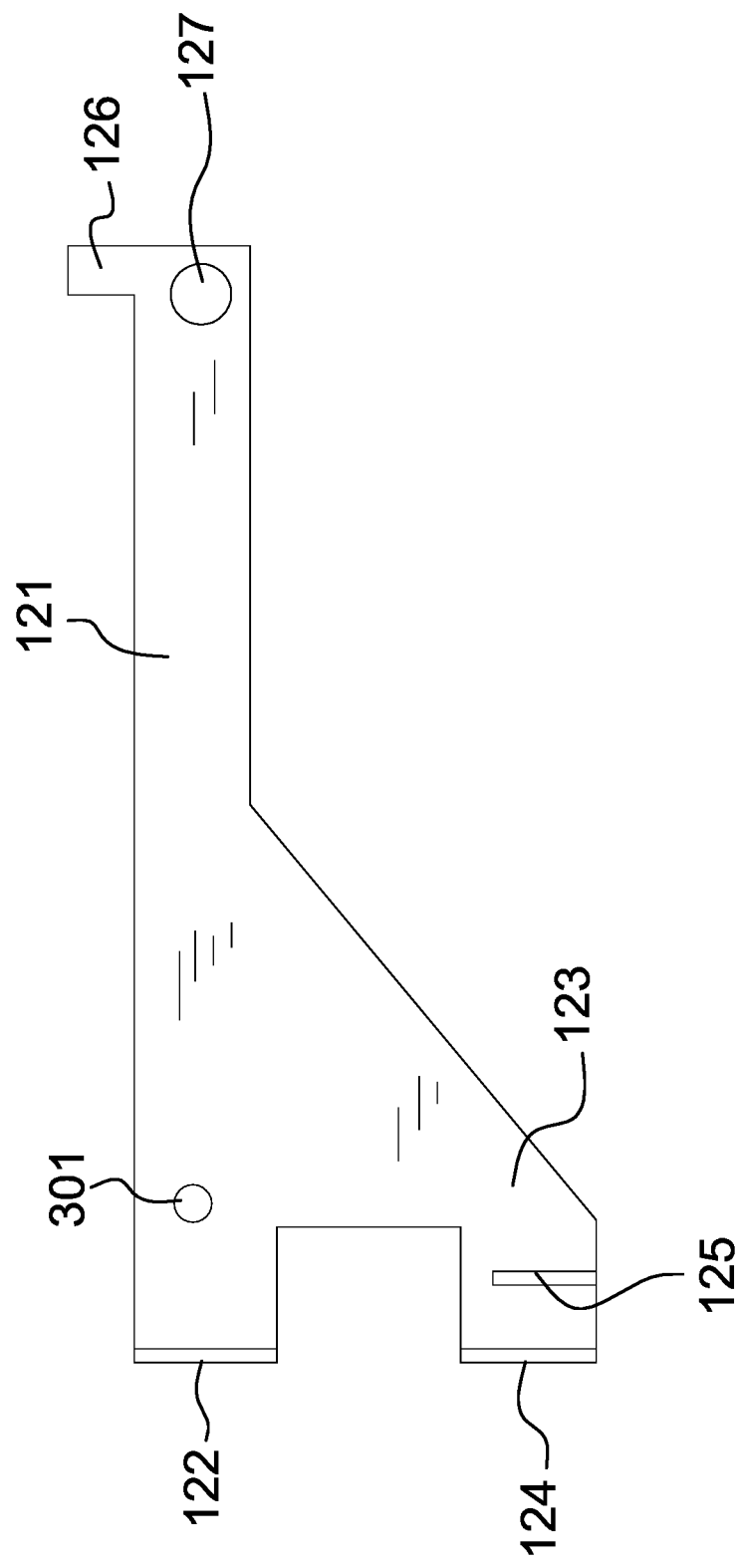
FIG. 3 is a rear view of an embodiment of the disclosure.
Figure 4:
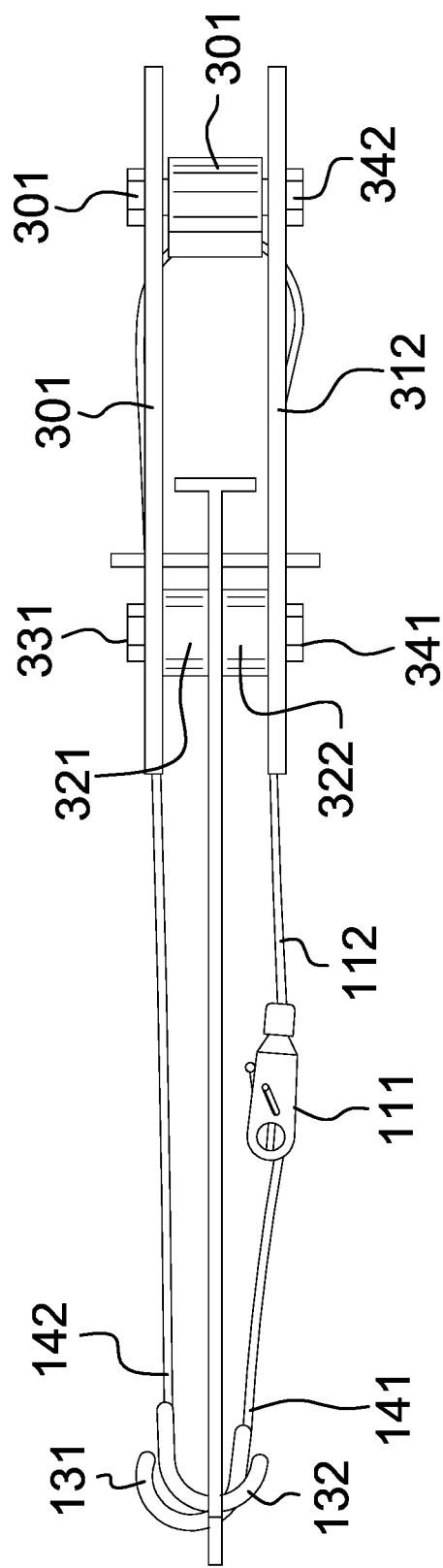
FIG. 4 is a top view of an embodiment of the disclosure.
Figure 5:
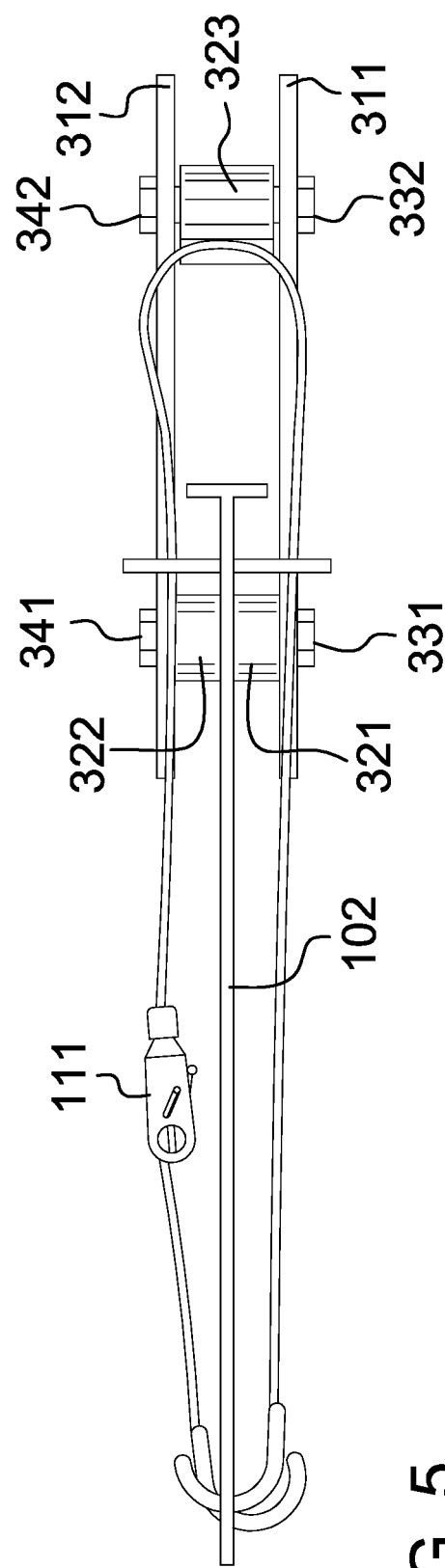
FIG. 5 is a bottom view of an embodiment of the disclosure.
Figure 6:
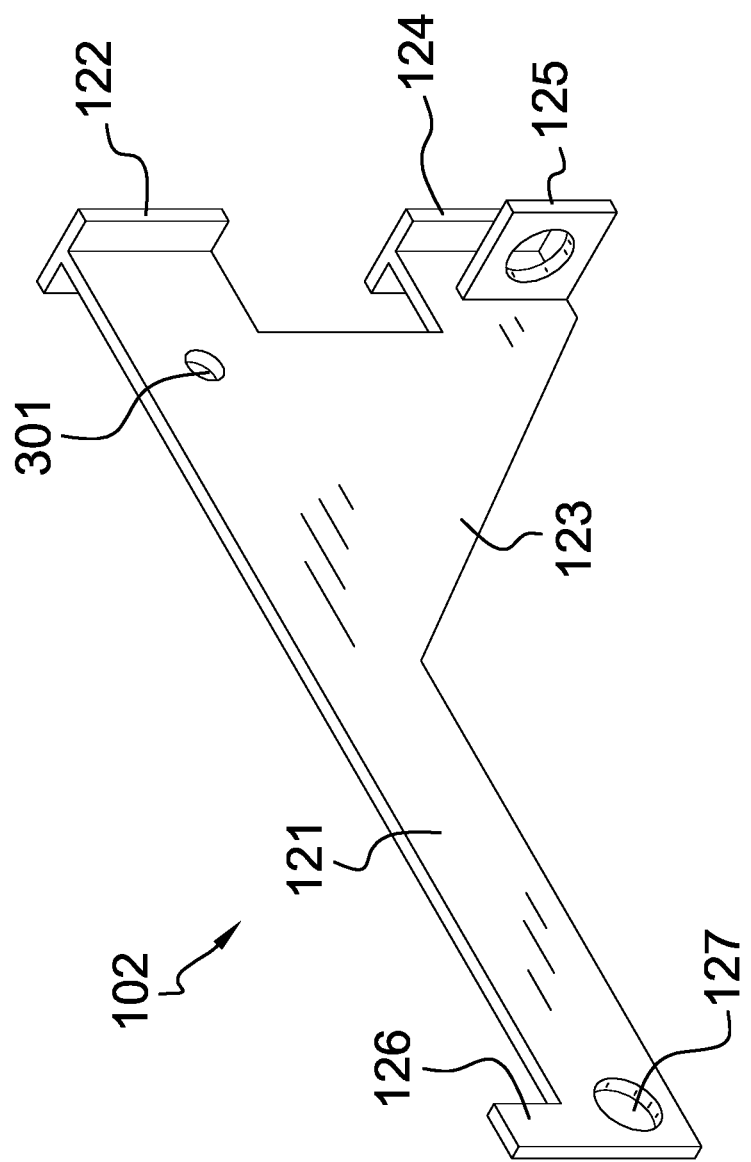
FIG. 6 is an in-use view of an embodiment of the disclosure.
Figure 7:
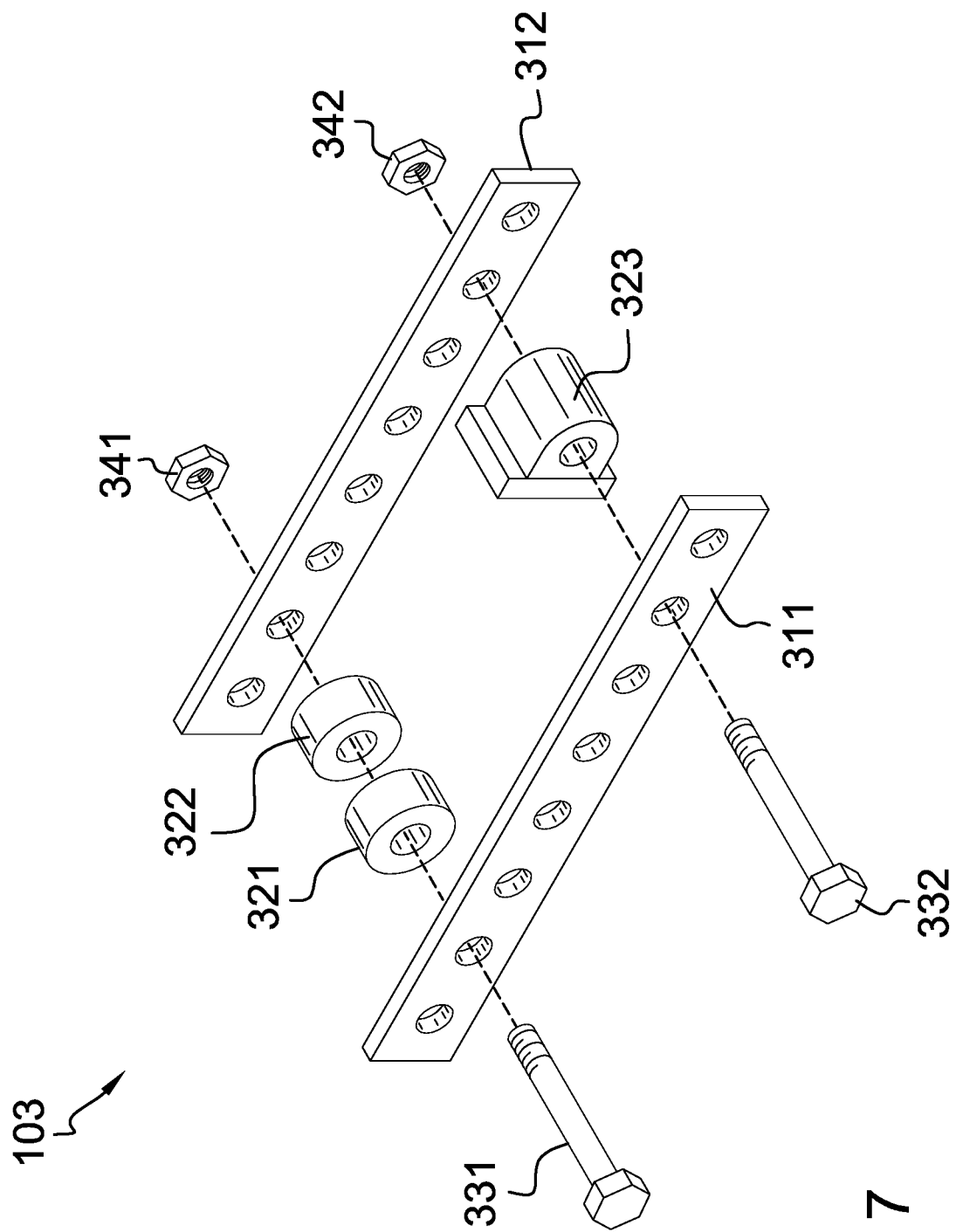
FIG. 7 is a detail perspective view of an embodiment of the disclosure.

Detailed reference will now be made to one or more potential embodiments of the disclosure, which are illustrated in FIGS. 1 through 7.

The scaffold securing clip and strap 100 (hereinafter invention) comprises a ratchet strap 101 and a scaffolding jib 102. The invention 100 is configured for use with a stanchion 201. The ratchet strap 101 attaches the scaffolding jib 102 to the stanchion 201. A first instantiation of the invention 100 works in conjunction with a second instantiation of the invention 100 to support one or more planks 202. Specifically, the scaffolding jib 102 of a first instantiation of the invention 100 and the scaffolding jib 102 of a second instantiation of the invention 100 combine to raise one or more planks 202 to an elevation above the supporting surface of the stanchions 201 to which the first instantiation of the invention 100 and the second instantiation of the invention 100 are attached. The elevated one or more planks 202 form a raised horizontal surface capable of supporting a load. The ratchet strap 101 is a textile based fastening device.

The ratchet strap 101 attaches the scaffolding jib 102 to the stanchion 201. The ratchet strap 101 is a tensioning device. The ratchet strap 101 comprises a ratchet mechanism 111 and a webbing 112.

The ratchet mechanism 111 is a well-known and commercially available ratcheting device. The ratchet mechanism 111 is a tensioning device. The ratchet mechanism 111 binds the scaffolding jib 102 to its associated stanchion 201 such that the scaffolding jib 102 projects radially away from the center axis of the stanchion.

The webbing 112 is a commercially available textile webbing 112. The use of a webbing 112 with a ratchet mechanism 111 is well-known and documented in the mechanical and textile arts. The webbing 112 comprises a first hook 131 and a second hook 132. The webbing 112 is further defined with a first end 141 and a second end 142.

The first hook 131 is a hook that attaches to the first end 141 of the webbing 112 of the ratchet strap 101. The first hook 131 secures the first end 141 of the webbing 112 to the joist 121 of the scaffolding jib 102. The second hook 132 is a hook that attaches to the second end 142 of the webbing 112 of the ratchet strap 101. The second hook 132 secures the second end 142 of the webbing 112 to the joist 121 of the scaffolding jib 102.

The scaffolding jib 102 forms a supporting structure. The scaffolding jib 102 attaches to a stanchion 201 such that the scaffolding jib 102 forms a cantilever structure. Two or more scaffolding jibs 102, each fastened to a scaffolding selected from a plurality of stanchions 201, are used to support one or more planks 202. The one or more planks 202 form an elevated horizontal surface that can be used to support a load. The scaffolding jib 102 transfers a portion of the load path generated by the one or more planks 202 to the stanchion 201. Each stanchion 201 used to form the scaffolding has attached to it only one scaffolding jib 102. Each of the scaffolding jibs 102 attaches to its associated stanchion 201 at the same elevation. The scaffolding jib 102 comprises a joist 121, a superior brace 122, an extension structure 123, an inferior brace 124, a fairlead 125, a plank tab 126, and an anchor point 127.

The joist 121 is a rectangular plate structure. The joist 121 forms the supporting structure upon which the one or more planks 202 are placed. The one or more planks 202 rest on the superior edge 193 of the joist 121. The joist 121 of each of the scaffolding jibs 102 have the same elevation such that the one or more planks 202 form a horizontal surface when resting on the scaffolding jibs 102. The joist 121 is further defined with a third end 143, a fourth end 144, an primary surface 191, an secondary surface 192, a superior edge 193 and an inferior edge 194.

The joist 121 further comprises a bolt hole 301. The bolt hole 301 is an aperture formed from the primary surface 191 to the secondary surface 192. The bracket 103 uses the bolt hole 301 to attach the invention 100 to the stanchion 201.

The primary surface 191 is the surface of the joist 121 with the largest surface area. The primary surface 191 is the surface of the joist 121 that is proximal to the stanchion 201. The secondary surface 192 is the surface of the joist 121 that is distal from the primary surface 191. The superior edge 193 is the edge of the joist 121 upon which the one or more planks 202 rest. The inferior edge 194 is the edge of the joist 121 that is distal from the superior edge 193.

The superior brace 122 is a plate that presses against the stanchion 201. The superior brace 122 is pulled against the stanchion 201 by the ratchet strap 101 to bind the scaffolding jib 102 to the stanchion 201. The superior brace 122 attaches to the third end 143 of the joist 121.

The extension structure 123 is a triangular plate structure. The extension structure 123 is a structure that separates the joist 121 from the fairlead 125. The extension structure 123 attaches to the inferior edge 194 of the joist 121 such that the surfaces of the joist 121 and the surfaces of the extension structure 123 align to form two single surfaces. The extension structure 123 separates the inferior edge 194 from the ratchet strap 101 such that the span of the distance between the joist 121 and the webbing 112 as the webbing 112 wraps around the stanchion 201 is consistently maintained.

The inferior brace 124 is a plate structure that attaches to the third end 143 of the joist 121. The inferior brace 124 presses against the stanchion 201 as the ratchet strap 101 tightens.

The fairlead 125 comprises two identical plate structures that attach to the extension structure 123 such that the fairlead 125 is parallel to the inferior brace 124. The fairlead 125 forms a guiding structure that separates the span of distance between the superior brace 122 and the inferior brace 124 of the scaffolding jib 102 and the webbing 112 of the ratchet strap 101. Each fairlead 125 comprises a fairlead plate 181 and a fairlead slot 182.

The fairlead plate 181 is a rectangular plate structure. The fairlead plate 181 attaches to the joist 121 such that the fairlead plate 181 is parallel to the inferior brace 124. The fairlead slot 182 is an aperture formed through the fairlead plate 181. The webbing 112 is threaded through the fairlead slot 182. The fairlead slot 182 guides the webbing 112 away from the joist 121 to form three points of contact that stabilize the scaffolding jib 102 against the stanchion 201.

The plank tab 126 is a rim that attaches to the superior edge 193 of the joist 121 at the fourth end 144 of the joist 121. The plank tab 126 prevents the one or more planks 202 from sliding off the fourth end 144 of the joist 121. The anchor point 127 is a structure that is formed on the fourth end 144 of the joist 121. The anchor point 127 forms an attachment point to which the first hook 131 and the second hook 132 of the webbing 112 attach when binding the scaffolding jib 102 to the stanchion 201. In the first potential embodiment of the disclosure, the anchor point 127 is an aperture formed through the superior edge 193 and the inferior edge 194 of the joist 121.

The bracket 103 is a mechanical structure that attaches the scaffolding jib 102 to the stanchion 201. The bracket 103 comprises a first slotted metal strap 311, a second slotted metal strap 312, a first spacer 321, a second spacer 322, a third spacer 323, a first bolt 331, a second bolt 332, a first nut 341, and a second nut 342.

The first slotted metal strap 311 is a commercially available metal strapping product often marketed to as a seismic strap. The first slotted metal strap 311 attaches to the second slotted metal strap 312 to secure the scaffolding jib 102 to the stanchion 201. The first slotted metal strap 311 is formed with a plurality of holes. The holes formed in the first slotted metal strap 311 are sized to receive the first bolt 331 and the second bolt 332.

The second slotted metal strap 312 is a commercially available metal strapping product often marketed to as a seismic strap. The second slotted metal strap 312 attaches to the first slotted metal strap 311 to attach the scaffolding jib 102 to the stanchion 201. The second slotted metal strap 312 is formed with a plurality of holes. The holes formed in the second slotted metal strap 312 are sized to receive the first bolt 331 and the second bolt 332.

The first slotted metal strap 311 and the second slotted metal strap 312 are identical. The first slotted metal strap 311 and the second slotted metal strap 312 are tightened against the stanchion 201 such that the first slotted metal strap 311 and the second slotted metal strap 312 bind the scaffolding jib 102 to the stanchion 201.

The first spacer 321 is a hollow cylindrical structure commonly sold as a steel flat washer. The first spacer 321 is an extension structure that separates the joist 121 from the first slotted metal strap 311 such that the curvature of the first slotted metal strap 311 is controlled. The first bolt 331 fits through the first slotted metal strap 311 and the first spacer 321 to insert into the bolt hole 301.

The second spacer 322 is a hollow cylindrical structure commonly sold as a steel flat washer. The second spacer 322 is an extension structure that separates the joist 121 from the second slotted metal strap 312 such that the curvature of the second slotted metal strap 312 is controlled. The first bolt 331 comes through the bolt hole 301 and the second spacer 322 to insert through a hole in the second slotted metal strap 312.

The first bolt 331 is a commercially available hardware item. The first nut 341 is a commercially available hardware item that is configured to attach to the first bolt 331. The use of a bolt and nut are well-known and documented in the mechanical arts. The first nut 341 attaches to the first bolt 331 such that the first slotted metal strap 311, the first spacer 321, the joist 121, the second spacer 322, and the second slotted metal strap 312 are secured to the stanchion 201.

The third spacer 323 is a hollow cylindrical structure commonly sold as a steel flat washer. The third spacer 323 is an extension structure that separates the first slotted metal strap 311 from the second slotted metal strap 312 such that the curvature of the first slotted metal strap 311 and the curvature of the second slotted metal strap 312 are controlled. The second bolt 332 fits through the first slotted metal strap 311, the third spacer 323, and the second slotted metal strap 312.

The second bolt 332 is a commercially available hardware item. The second nut 342 is a commercially available hardware item that is configured to attach to the second bolt 332. The use of a bolt and nut are well-known and documented in the mechanical arts. The second nut 342 attaches to the second bolt such that the first slotted metal strap 311, the third spacer 323 and the second slotted metal strap 312 are secured to the stanchion 201.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Beam: As used in this disclosure, a beam is a horizontally oriented shaft that: 1) is suspended above a supporting surface; and, 2) bears a load.

Bind: As used in this disclosure, to bind is a verb that means to tie or secure a first object to a second object using a cord or webbing.

Bracket: As used in this disclosure, a bracket is a mechanical structure that attaches a second structure to a first structure such that the load path of the second structure is fully transferred to the first structure.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Clip: As used in this disclosure, a clip is a fastener that attaches to an object by gripping or clasping the object Elevation: As used in this disclosure, elevation refers to the span of the distance between a horizontal surface and a supporting surface as measured in the direction opposite to the force of gravity.

Extension Structure: As used in this disclosure, an extension structure is an inert physical structure that is used to extend the span of the distance between any two objects.

Fairlead: As used in this disclosure, a fairlead is a loop or ring structure that is used to guide a cord or a webbing along a desired path.

Hook: As used in this disclosure, a hook is an object that is curved or bent at an angle such that items can be hung on or caught by the object.

Instantiation: As used in this disclosure, an instantiation refers to a specific physical object or process that is created using a specification.

Jib: As used in this disclosure, a jib is a beam structure that: 1) is mounted with a free end in the manner of a cantilever; and, 2) suspends a load at the free end of the jib. In multicomponent beam structures, such as with a crane, the jib is the sub-structure that physically suspends the load.

Joists: As used in this disclosure, the term joists refers to a plurality of parallel horizontal beams that are used to support a floor or a ceiling. A single beam selected from the plurality of parallel horizontal beams is referred to in the singular as a joist.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook inserts through the space formed within the first linear structure. Within this disclosure, the first linear structure is said to be looped around the second linear structure.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal, plastic, and wood. When made of wood, a plate is often referred to as a plank.

Radial: As used in this disclosure, the term radial refers to a direction that: 1) is perpendicular to an identified central axis; or, 2) projects away from a center point.

Ratchet: As used in this disclosure, a ratchet is a device comprising a pawl or hinged catch that engages the sloping teeth of a wheel or bar permitting motion in one direction only.

Ring: As used in this disclosure, a ring is term that is used to describe a flat or plate like structure through which an aperture is formed. Rings are often considered loops.

Scaffolding: As used in this disclosure, a scaffolding is a temporary structure that provides a raised platform upon which maintenance and repair activities on a building or other tall structure can be performed.

Slide: As used in this disclosure, slide is a verb that refers to an object that is transported along a surface while in continuous contact with the surface. An object being transported along a surface with wheels cannot be said to be sliding.

Stanchion: As used in this disclosure, a stanchion refers to a vertical pole, post, or support.

Superior: As used in this disclosure, the term superior refers to a directional reference that is parallel to and in the opposite direction of the force of gravity.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Textile: As used in this disclosure, a textile is a material that is woven, knitted, braided or felted. Synonyms in common usage for this definition include fabric and cloth.

Thread: As used in this disclosure, to thread is a verb that refers to inserting a cord or a webbing through one or more holes.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A temporary elevated structure comprising:
a ratchet strap a scaffolding jib, and a bracket;
wherein the temporary elevated structure is configured for use with a stanchion;
wherein the ratchet strap attaches the scaffolding jib to the stanchion;
wherein the bracket attaches the scaffolding jib to the stanchion;
wherein the bracket comprises a first slotted metal strap, a second slotted metal strap, a first spacer, a second spacer, a third spacer, a first bolt, a second bolt, a first nut, and a second nut;
wherein the first slotted metal strap attaches to the second slotted metal strap to secure the scaffolding jib to the stanchion;
wherein the first slotted metal strap and the second slotted metal strap are identical;
wherein the first nut attaches to the first bolt such that the first slotted metal strap, the first spacer, the joist, the second spacer, and the second slotted metal strap are secured to the stanchion;
wherein the second nut attaches to the second bolt such that the first slotted metal strap, the third spacer and the second slotted metal strap are secured to the stanchion;
wherein the third spacer has a flat plate for engaging the post to distribute a compressive load.

2. The temporary elevated structure according to claim 1
wherein a first instantiation of the temporary elevated structure coordinates with a second instantiation of the temporary elevated structure to support one or more planks;
wherein the scaffolding jib of a first instantiation of the temporary elevated structure and the scaffolding jib of a second instantiation of the temporary elevated structure combine to raise one or more planks to an elevation above the supporting surface of the stanchions to which the first instantiation of the temporary elevated structure and the second instantiation of the temporary elevated structure are attached;
wherein the elevated one or more planks form a raised horizontal surface capable of supporting a load;
wherein the ratchet strap is a textile based fastening device;
wherein the ratchet strap is a tensioning device.

3. The temporary elevated structure according to claim 2
wherein the ratchet strap comprises a ratchet mechanism and a webbing;
wherein the ratchet mechanism binds the scaffolding jib to its associated stanchion such that the scaffolding jib projects radially away from the stanchion;
wherein the webbing is a textile webbing.

4. The temporary elevated structure according to claim 3
wherein the scaffolding jib is a supporting structure;
wherein two or more scaffolding jibs, each associated with an instantiation of the temporary elevated structure support one or more planks;
wherein the scaffolding jib attaches to a stanchion such that the scaffolding jib forms a cantilever structure;
wherein the one or more planks form an elevated horizontal surface that can be used to support a load;
wherein the scaffolding jib transfers a portion of the load path generated by the one or more planks to the stanchion;
wherein each stanchion used to form the scaffolding has attached to it only one scaffolding jib;
wherein each of the scaffolding jibs attaches to its associated stanchion at the same elevation.

5. The temporary elevated structure according to claim 4
wherein the webbing comprises a first hook and a second hook;

wherein the webbing is further defined with a first end and a second end;

wherein the first hook attaches to the first end of the webbing of the ratchet strap;

wherein the second hook is a hook attaches to the second end of the webbing of the ratchet strap.

6. The temporary elevated structure according to claim 5 wherein the first hook secures the first end of the webbing to the scaffolding jib;

wherein the second hook secures the second end of the webbing to the joist of the scaffolding jib.

7. The temporary elevated structure according to claim 6 wherein the scaffolding jib comprises a joist, a superior brace, an extension structure, an inferior brace, a fairlead, a plank tab, and an anchor point;

wherein the superior brace, the extension structure, the inferior brace, the fairlead, the plank tab, and the anchor point attach to the joist.

8. The temporary elevated structure according to claim 7 wherein the joist is a rectangular plate structure;

wherein the joist is further defined with a third end, a fourth end, a primary surface, a secondary surface, a superior edge and an inferior edge;

wherein the joist forms the supporting structure upon which the one or more planks are placed;

wherein the one or more planks rest on the superior edge of the joist;

wherein the joist of each of the scaffolding jibs have the same elevation such that the one or more planks form a horizontal surface when resting on the scaffolding jibs.

9. The temporary elevated structure according to claim 8 wherein the superior brace is a plate;

wherein the superior brace presses against the stanchion;

wherein the superior brace is pulled against the stanchion by the ratchet strap to bind the scaffolding jib to the stanchion.

10. The temporary elevated structure according to claim 9 wherein the extension structure is a triangular plate structure;

wherein the extension structure separates the joist from the fairlead;

wherein the extension structure attaches to the inferior edge of the joist such that the surfaces of the joist and the surfaces of the extension structure align to form two single surfaces.

11. The temporary elevated structure according to claim 10 wherein the extension structure separates the inferior edge from the ratchet strap such that the span of the distance between the joist and the webbing as the webbing wraps around the stanchion is consistently maintained.

12. The temporary elevated structure according to claim 11 wherein the inferior brace is a plate structure;

wherein the inferior brace projects perpendicularly away from the of the joist;

wherein the inferior brace presses against the stanchion.

13. The temporary elevated structure according to claim 12 wherein the fairlead comprises two identical plate structures that attach to the extension structure such that the fairlead is parallel to the inferior brace;

wherein the fairlead forms a guiding structure that separates the span of distance between the superior brace of the scaffolding jib and the webbing of the ratchet strap;

wherein the fairlead forms a guiding structure that separates the span of distance between the inferior brace of the scaffolding jib and the webbing of the ratchet strap.

14. The temporary elevated structure according to claim 13 wherein each plate that forms the fairlead comprises a fairlead plate and a fairlead slot;

wherein the fairlead slot is an aperture formed through the fairlead plate;

wherein the fairlead plate is a rectangular plate structure;

wherein the fairlead plate attaches to the joist such that the fairlead plate is parallel to the anterior plate of the inferior brace.

15. The temporary elevated structure according to claim 14 wherein the webbing is threaded through each fairlead slot;

wherein each fairlead slot guides the webbing away from the joist to form three points of contact that stabilize the scaffolding jib against the stanchion.

16. The temporary elevated structure according to claim 15 wherein the plank tab is a rim that attaches to the superior edge of the joist at the fourth end of the joist.

17. The temporary elevated structure according to claim 16 wherein the anchor point is a structure formed on the joist;

wherein the anchor point forms an attachment point to which the first hook and the second hook of the webbing attach when binding the scaffolding jib to the stanchion.

18. The temporary elevated structure according to claim 17 wherein the superior brace attaches to the third end of the joist;

wherein the anchor point is an aperture formed through the superior edge and the inferior edge of the joist;

wherein the inferior brace attaches to the third end of the joist.

19. The temporary elevated structure according to claim 17 wherein the first slotted metal strap is formed with a plurality of holes;

wherein the second slotted metal strap is formed with a plurality of holes;

wherein the holes formed in the first slotted metal strap are sized to receive the first bolt and the second bolt;

wherein the holes formed in the second slotted metal strap are sized to receive the first bolt and the second bolt;

wherein the first spacer is a hollow cylindrical structure;

wherein the second spacer is a hollow cylindrical structure;

wherein the third spacer is a hollow cylindrical structure;

wherein the first bolt is a hardware item;

wherein the first nut is a hardware item that is configured to attach to the first bolt;

wherein the second bolt is a hardware item;

wherein the second nut is a hardware item that is configured to attach to the second bolt.

\* \* \* \* \*